US010210011B2

(12) United States Patent
Gautam et al.

(10) Patent No.: US 10,210,011 B2
(45) Date of Patent: Feb. 19, 2019

(54) EFFICIENT VM MIGRATION ACROSS CLOUD USING CATALOG AWARE COMPRESSION

(71) Applicant: VMWARE, INC., Palo Alto, CA (US)

(72) Inventors: Ajay Gautam, Bangalore (IN); Kumar Gaurav, Bangalore (IN); Gurusreekanth Chagalakondu, Bangalore (IN); Jayalekshmy Nair, Bangalore (IN); Jobin George, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 94 days.

(21) Appl. No.: 15/169,772

(22) Filed: Jun. 1, 2016

(65) Prior Publication Data

US 2017/0277555 A1  Sep. 28, 2017

(30) Foreign Application Priority Data

Mar. 26, 2016  (IN) .............................. 201641010394

(51) Int. Cl.
| G06F 9/455 | (2018.01) |
| G06F 9/48 | (2006.01) |
| G06F 17/30 | (2006.01) |
| H04L 29/06 | (2006.01) |

(52) U.S. Cl.
CPC .... *G06F 9/45558* (2013.01); *G06F 17/30097* (2013.01); *H04L 69/04* (2013.01); *G06F 2009/4557* (2013.01); *G06F 2009/45595* (2013.01)

(58) Field of Classification Search
CPC ........... G06F 9/45558; G06F 17/30097; G06F 2009/4557; G06F 2009/45595; H04L 69/04

See application file for complete search history.

(56) References Cited

U.S. PATENT DOCUMENTS

| 9,710,465 | B2 * | 7/2017 | Dornemann | ........ G06F 9/45558 |
| 9,727,273 | B1 * | 8/2017 | Dantkale | ................ G06F 3/0641 |
| 2012/0084445 | A1 * | 4/2012 | Brock | ................... G06F 9/5077 709/226 |
| 2012/0254131 | A1 * | 10/2012 | Al Kiswany | ..... G06F 17/30233 707/692 |
| 2012/0324446 | A1 * | 12/2012 | Fries | ...................... G06F 21/64 718/1 |
| 2014/0297603 | A1 * | 10/2014 | Kim | .................. G06F 17/30159 707/692 |
| 2015/0052525 | A1 * | 2/2015 | Raghu | ..................... G06F 9/455 718/1 |
| 2015/0378762 | A1 * | 12/2015 | Saladi | ................. H04L 41/0816 718/1 |
| 2017/0031710 | A1 * | 2/2017 | Kuik | ..................... G06F 9/4856 |

* cited by examiner

*Primary Examiner* — Lewis A Bullock, Jr.
*Assistant Examiner* — Kevin X Lu
(74) *Attorney, Agent, or Firm* — Loza & Loza, LLP

(57) ABSTRACT

Techniques for migrating a VM in a hybrid cloud computing system are provided. The techniques include identifying a similar VM at the destination, comparing dictionaries for the VM to be transmitted and the similar VM, and compressing the VM based on the comparison. After transmitting the compressed VM, the destination decompresses the VM using the dictionary of the similar VM. Dictionaries associate chunks of VM data with hashes of those chunks. This allows replacement of chunks with the hashes, thereby compressing the VM for transmission.

20 Claims, 7 Drawing Sheets

EFFICIENT VM MIGRATION ACROSS CLOUD USING CATALOG AWARE COMPRESSION

RELATED APPLICATION

Benefit is claimed under 35 U.S.C. 119(a)-(d) to Foreign Application Serial No. 201641010394 filed in India entitled "EFFICIENT VM MIGRATION ACROSS CLOUD USING CATALOG AWARE COMPRESSION", filed on Mar. 26, 2016, by VMware, Inc., which is herein incorporated in its entirety by reference for all purposes.

BACKGROUND

Hybrid cloud computing systems are used to extend the capabilities of an organization's private data center that manages and executes workloads using computing resources such as virtual machines. A "public" cloud system serves multiple "tenants" and can expand the capabilities of such tenants by providing computing resources to the tenants on demand. For example, a private data center may migrate some virtual machines to the public cloud system for execution in order to free up computing resources for other work.

Although convenient, migration of virtual machines across systems in a hybrid cloud computing system may be slow. More specifically, virtual machines typically include large amounts of data, the vast majority of which is included in virtual machine disk ("VMDK") files that represent virtual disk drives for the virtual machines. These files can include many gigabytes of data, meaning that transfer of such files may be a slow process and may also consume large amounts of bandwidth.

SUMMARY

A method for migrating a first virtual machine from a source computing system to a destination computing system is provided. The method includes identifying a first dictionary for the first virtual machine. The method also includes comparing the first dictionary with a second dictionary that corresponds to a second virtual machine at the destination computing system, to output a set of common hashes. The method further includes based on the set of common hashes, compressing the first virtual machine to generate a compressed virtual machine. The method also includes transferring the compressed virtual machine to the destination computing system.

Other embodiments include a system and a non-transitory computer-readable medium storing instructions that, when executed by a processor, cause the processor to perform a method.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
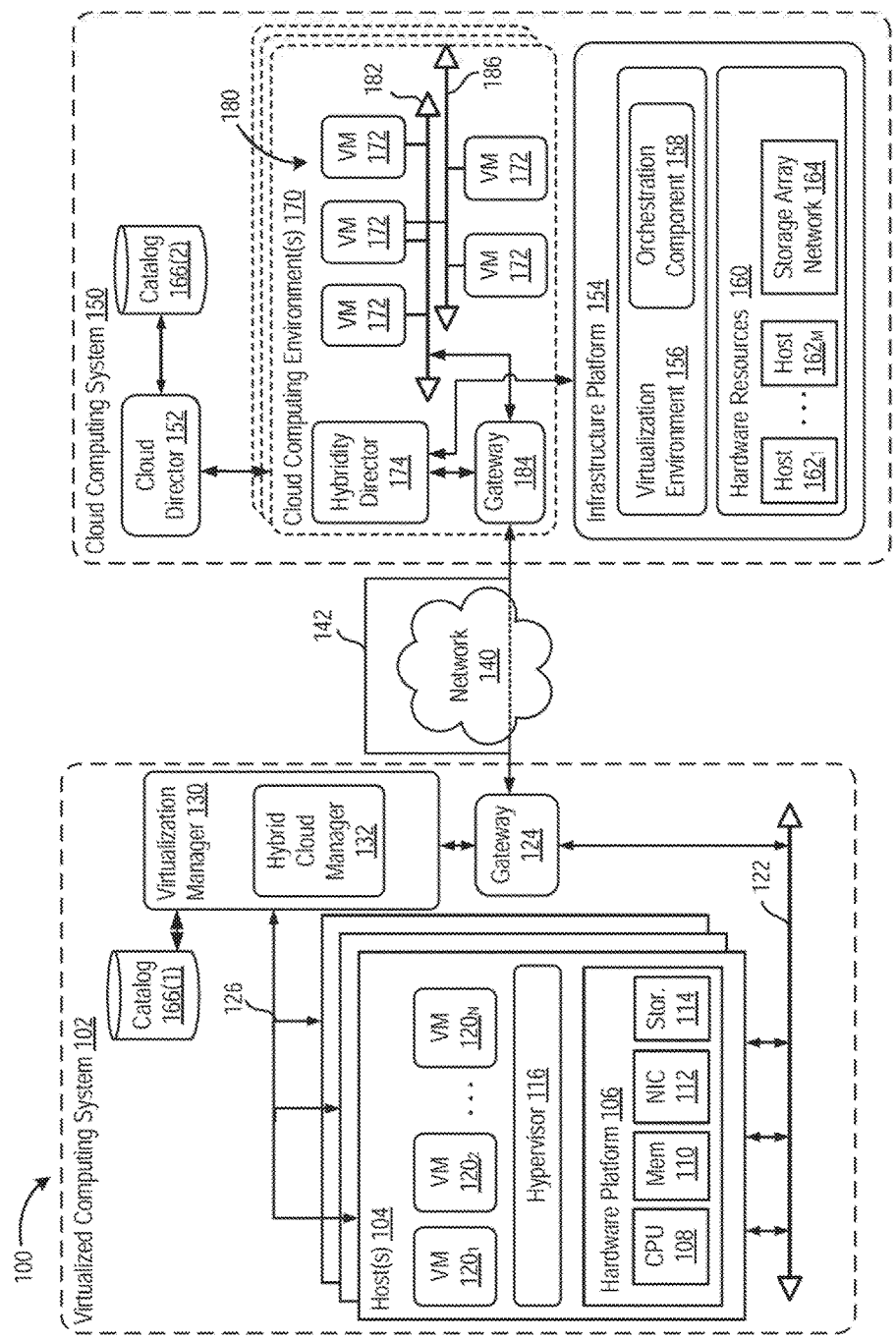
FIG. 1 is a block diagram of a hybrid cloud computing system in which one or more embodiments of the present disclosure may be utilized.

FIG. 1 is a block diagram of a hybrid cloud computing system 100 in which one or more embodiments of the present disclosure may be utilized. Hybrid cloud computing system 100 includes a virtualized computing system 102 and a cloud computing system 150, and is configured to provide a common platform for managing and executing virtual workloads seamlessly between virtualized computing system 102 and cloud computing system 150. In one embodiment, virtualized computing system 102 may be a data center controlled and administrated by a particular enterprise or business organization, while cloud computing system 150 is operated by a cloud computing service provider and exposed as a service available to account holders, such as the particular enterprise in addition to other enterprises. As such, virtualized computing system 102 may sometimes be referred to as an on-premise data center(s), and cloud computing system 150 may be referred to as an off-premise data center(s). In some embodiments, virtualized computing system 102, itself, may be configured as a private cloud service provided by the enterprise.

As used herein, an internal cloud or "private" cloud is a cloud in which a tenant and a cloud service provider are part of the same organization, while an external or "public" cloud is a cloud that is provided by an organization that is separate from a tenant that accesses the external cloud. For example, the tenant may be part of an enterprise, and the external cloud may be part of a cloud service provider that is separate from the enterprise of the tenant and that provides cloud services to different enterprises and/or individuals. In embodiments disclosed herein, a hybrid cloud is a cloud architecture in which a tenant is provided with seamless access to both private cloud resources and public cloud resources.

Virtualized computing system 102 includes one or more host computer systems 104. Hosts 104 may be constructed on a server grade hardware platform 106, such as an x86 architecture platform, a desktop, and a laptop. As shown, hardware platform 106 of each host 104 may include conventional components of a computing device, such as one or more processors (CPUs) 108, system memory 110, a network interface 112, storage 114, and other I/O devices such as, for example, a mouse and keyboard (not shown). Processor 108 is configured to execute instructions, for example, executable instructions that perform one or more operations described herein and may be stored in memory 110 and in local storage. Memory 110 is a device allowing information, such as executable instructions, cryptographic keys virtual disks, configurations, and other data, to be stored and retrieved. Memory 110 may include, for example, one or more random access memory (RAM) modules. Network interface 112 enables host 104 to communicate with another device via a communication medium, such as a network 122 within virtualized computing system 102. Network interface 112 may be one or more network adapters, also referred to as a Network Interface Card (NIC).

Storage 114 represents local storage devices (e.g., one or more hard disks, flash memory modules, solid state disks, and optical disks) and/or a storage interface that enables host 104 to communicate with one or more network data storage systems. Examples of a storage interface are a host bus adapter (HBA) that couples host 104 to one or more storage arrays, such as a storage area network (SAN) or a network-attached storage (NAS), as well as other network data storage systems.

Each host 104 is configured to provide a virtualization layer that abstracts processor, memory, storage, and networking resources of hardware platform 106 into multiple virtualized execution contexts. The term "virtualized execution contexts" refers to environments in which software, such as applications, may execute and be isolated from other software. Examples of virtualized execution contexts include virtual machines, containers (such as Docker containers), and other contexts. In some embodiments, the virtualized execution contexts are virtual machines, such as virtual machines $120_1$ to $120_N$ (collectively referred to as VMs 120) that run concurrently on the same hosts. VMs 120 run on top of a software interface layer, referred to herein as a hypervisor 116, that enables sharing of the hardware resources of host 104 by VMs 120. One example of hypervisor 116 that may be used in an embodiment described herein is a VMware ESXi hypervisor provided as part of the VMware vSphere solution made commercially available from VMware, Inc. Hypervisor 116 may run on top of the operating system of host 104 or directly on hardware components of host 104.

Virtualized computing system 102 includes a virtualization management module (depicted in FIG. 1 as virtualization manager 130) that may communicate to the plurality of hosts 104 via a network, sometimes referred to as a management network 126. In one embodiment, virtualization manager 130 is a computer program that resides and executes in a central server, which may reside in virtualized computing system 102, or alternatively, may run in a VM in one of hosts 104. One example of a virtualization management module is the vCenter Server™ product made available from VMware, Inc. Virtualization manager 130 is configured to carry out administrative tasks for computing system 102, including managing hosts 104, managing VMs 120 running within each host 104, provisioning VMs, migrating VMs from one host to another host, and load balancing between hosts 104.

In one embodiment, virtualization manager 130 includes a hybrid cloud management module (depicted as hybrid cloud manager 132) configured to manage and integrate virtual computing resources provided by cloud computing system 150 with virtual computing resources of computing system 102 to form a unified "hybrid" computing platform. Hybrid cloud manager 132 is configured to deploy VMs in cloud computing system 150, transfer VMs from virtualized computing system 102 to cloud computing, system 150, and perform other "cross-cloud" administrative task, as described in greater detail later. In one implementation, hybrid cloud manager 132 is a module or plug-in complement to virtualization manager 130, although other implementations may be used, such as a separate computer program executing in a central server or running in a VM in one of hosts 104.

In one embodiment, hybrid cloud manager 132 is configured to control network traffic into network 122 via a gateway component (depicted as a gateway 124). Gateway 124 (e.g., executing as a virtual appliance) is configured to provide VMs 120 and other components in virtualized computing system 102 with connectivity to an external network 140 (e.g., Internet). Gateway 124 may manage external public IP addresses for VMs 120, route traffic incoming to and outgoing from virtualized computing system 102 and provide networking services, such as firewalls, network address translation (NAT), dynamic host configuration protocol (DHCP), load balancing, and virtual private network (VPN) connectivity over a network 140.

In one or more embodiments, cloud computing system 150 is configured to dynamically provide an enterprise (or users of an enterprise) with one or more virtual data centers 180 in which a user may provision VMs 120, deploy multi-tier applications on VMs 120, and/or execute workloads. Cloud computing system 150 includes an infrastructure platform 154 upon which a cloud computing environment 170 may be executed. In the particular embodiment of FIG. 1, infrastructure platform 154 includes hardware resources 160 having computing resources (e.g., hosts $162_1$ to $162_N$), storage resources (e.g., one or more storage array systems, such as SAN 164), and networking resources, which are configured in a manner to provide a virtualization environment 156 that supports the execution of a plurality of virtual machines 172 across hosts 162. It is recognized that hardware resources 160 of cloud computing system 150 may in fact be distributed across multiple data centers in different locations.

Each cloud computing environment 170 is associated with a particular tenant of cloud computing system 150, such as the enterprise providing virtualized computing system 102. In one embodiment, cloud computing environment 170 may be configured as a dedicated cloud service for a single tenant comprised of dedicated hardware resources 160 (i.e., physically isolated from hardware resources used by other users of cloud computing system 150). In other embodiments, cloud computing environment 170 may be configured as part of a multi-tenant cloud service with logically isolated virtual computing resources on a shared physical infrastructure. As shown in FIG. 1, cloud computing system 150 may support multiple cloud computing environments 170, available to multiple enterprises in single-tenant and multi-tenant configurations. Note that the term "tenant" may be used to indicate a particular entity utilizing resources of the hybrid cloud computing system.

In one embodiment, virtualization environment 156 includes an orchestration component 158 (e.g., implemented as a process running in a VM) that provides infrastructure resources to cloud computing environment 170 responsive to provisioning requests. For example, if an enterprise required a specified number of virtual machines to deploy a web application or to modify (e.g., scale) a currently running web application to support peak demands, orchestration component 158 can initiate and manage the instantiation of virtual machines (e.g., VMs 172) on hosts 162 to support such requests. In one embodiment, orchestration component 158 instantiates virtual machines according to a requested template that defines one or more virtual machines having specified virtual computing resources (e.g., compute, networking, storage resources). Further, orchestration component 158 monitors the infrastructure resource consumption levels and requirements of cloud computing environment 170 and provides additional infrastructure resources to cloud computing environment 170 as needed or desired. In one example, similar to virtualized computing system 102, virtualization environment 156 may be implemented by running on hosts 162 VMware ESX™-based hypervisor technologies provided by VMware, Inc. of Palo Alto, Calif. (although it should be recognized that usage of any other virtualization technologies, including Xen® and Microsoft Hyper-V virtualization technologies is consistent with the teachings herein).

In one embodiment, cloud computing system 150 may include a cloud director 152 (which may be embodied as software running in one or more virtual machines or outside of virtual machines) that manages allocation of virtual computing resources to an enterprise for deploying applications. Cloud director 152 may be accessible to users via a REST (Representational State Transfer) API (Application Programming Interface) or any other client-server communication protocol. Cloud director 152 may authenticate connection attempts from the enterprise using credentials issued by the cloud computing provider. Cloud director 152 maintains and publishes a catalog 166 of available virtual machine templates and packaged virtual machine applications that represent virtual machines that may be provisioned in cloud computing environment 170. A virtual machine template is a virtual machine image that is loaded with a pre-installed guest operating system, applications, and data, and is typically used to repeatedly create a VM having the pre-defined configuration. A packaged virtual machine application is a logical container of pre-configured virtual machines having software components and parameters that define operational details of the packaged application. An example of a packaged VM application is vApp™ technology made available by VMware, Inc., of Palo Alto, Calif., although other technologies may be utilized. Cloud director 152 receives provisioning requests submitted (e.g., via REST API calls) and may propagate such requests to orchestration component 158 to instantiate the requested virtual machines (e.g., VMs 172). Note that virtualization manager 130 of virtualized computing system 102 also maintains a catalog 166(1) that may store VM templates in a similar manner as catalog 166(2) maintained by cloud director 152 of cloud computing system 150.

In the embodiment of FIG. 1, cloud computing environment 170 supports the creation of a virtual data center 180 having a plurality of virtual machines 172 instantiated to, for example, host deployed multi-tier applications. A virtual data center 180 is a logical construct that provides compute, network, and storage resources to an organization. Virtual data centers 180 provide an environment where VM 172 can be created, stored, and operated, enabling complete abstraction between the consumption of infrastructure service and underlying resources, VMs 172 may be configured similarly to VMs 120, as abstractions of processor, memory, storage, and networking resources of hardware resources 160.

Virtual data center 180 includes one or more virtual networks 182 used to communicate between VMs 172 and managed by at least one networking gateway component (e.g., gateway 184), as well as one or more isolated internal networks 186 not connected to gateway 184. Gateway 184 (e.g., executing as a virtual appliance) is configured to provide VMs 172 and other components in cloud computing environment 170 with connectivity to external network 140 (e.g., Internet). Gateway 184 manages external public IP addresses for virtual data center 180 and one or more private internal networks interconnecting VMs 172. Gateway 184 is configured to route traffic incoming to and outgoing from virtual data center 180 and provide networking services, such as firewalls, network address translation (NAT), dynamic host configuration protocol (DHCP), and load balancing. Gateway 184 may be configured to provide virtual private network (VPN) connectivity over a network 140 with another VPN endpoint, such as a gateway 124 within virtualized computing system 102. In other embodiments, gateway 184 may be configured to connect to communicate with virtualized computing system 102 using a high-throughput, dedicated link (depicted as a direct connect 142) between virtualized computing system 102 and cloud computing system 150. In one or more embodiments, gateways 124 and 184 are configured to provide a "stretched" layer-2 (L2) network that spans virtualized computing system 102 and virtual data center 180, as shown in FIG. 1.

While FIG. 1 depicts a single connection between on-premise gateway 124 and cloud-side gateway 184 for illustration purposes, it should be recognized that multiple connections between multiple on-premise gateways 124 and cloud-side gateways 184 may be used. Furthermore, while FIG. 1 depicts a single instance of a gateway 184, it is recognized that gateway 184 may represent multiple gateway components within cloud computing system 150. In some embodiments, a separate gateway 184 may be deployed for each virtual data center, or alternatively, for each tenant. In some embodiments, a gateway instance may be deployed that manages traffic with a specific tenant, while a separate gateway instance manages public-facing traffic to the Internet. In yet other embodiments, one or more gateway instances that are shared among all the tenants of cloud computing system 150 may be used to manage all public-facing traffic incoming and outgoing from cloud computing system 150.

In one embodiment, each virtual data center 180 includes a "hybridity" director module (depicted as hybridity director 174) configured to communicate with the corresponding hybrid cloud manager 132 in virtualized computing system 102 to enable a common virtualized computing platform between virtualized computing system 102 and cloud computing system 150. Hybridity director 174 (e.g., executing as a virtual appliance) may communicate with hybrid cloud manager 132 using Internet-based traffic via a VPN tunnel established between gateways 124 and 184, or alternatively, using direct connect 142. In one embodiment, hybridity director 174 may control gateway 184 to control network traffic into virtual data center 180. In some embodiments, hybridity director 174 may control VMs 172 and hosts 162 of cloud computing system 150 via infrastructure platform 154.

The various components of hardware platform 106 may differ across different host computer systems 104. For example, the processor in one host computer system 104 may belong to the Intel family of processors while the processor in a different host computer system 104 may belong to the AMD family of processors. Processors 108 may also differ in other ways, such as processor speed, architecture bit size, and in other ways.

Virtualized computing system 102 and cloud computing system 150 may cooperate to migrate VMs from one to the other. Migrating a VM allows a VM that is executing in one system to execute in a different system (e.g., may transfer a VM from cloud computing system 150 to virtualized computing system 102 or vice versa). To migrate a VM, data for the VM is transferred from one system to another. Such data includes virtual machine metadata that describes the configuration of the VM as well as one or more virtual machine disk files (VMDK file). VMDK files are generally quite large as they store the entire contents of a virtualized hard drive for a VM. Thus, transfer of such files across a network (e.g., network 140) takes a substantial amount of time. For this reason, techniques are provided herein to reduce the amount of data that is transferred to migrate a VM.

Figure 2:
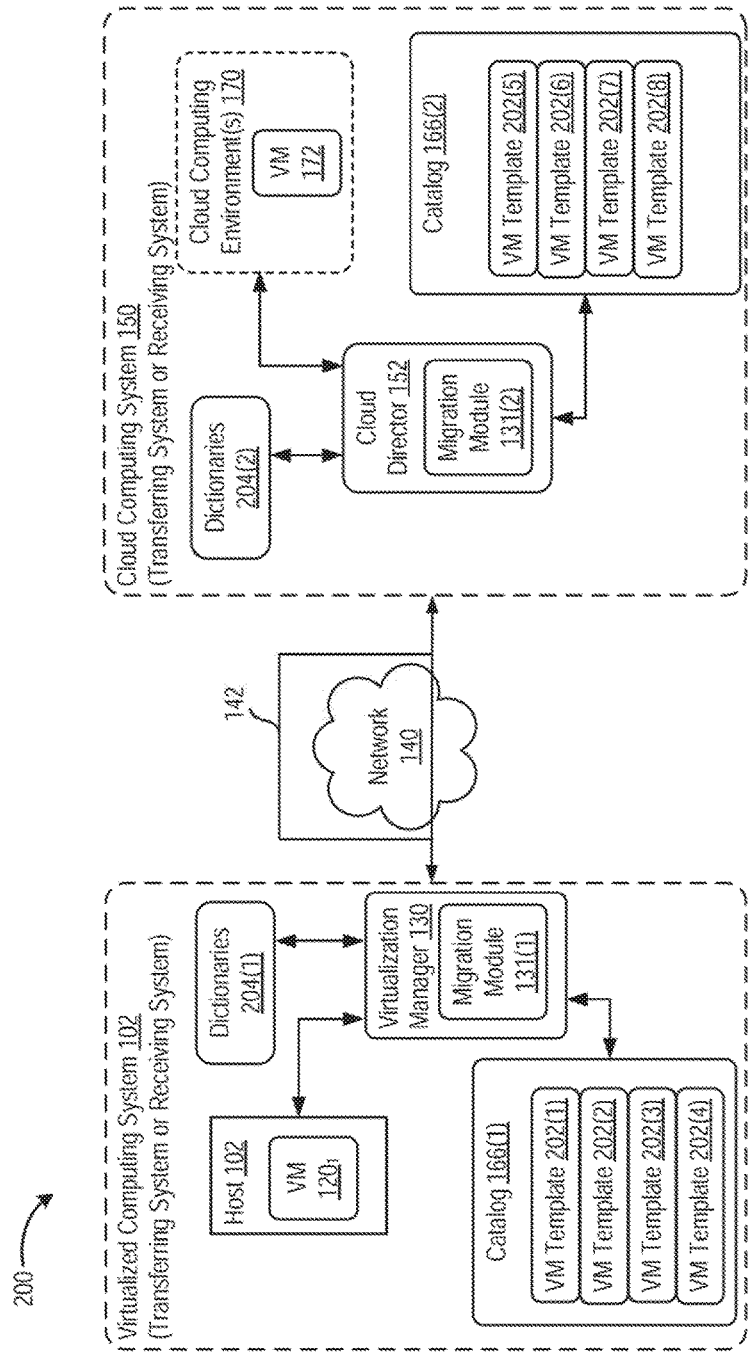
FIG. 2 is block diagram of the hybrid cloud computing system of FIG. 1, illustrating certain additional details, according to an example.

FIG. 2 is another block diagram of the hybrid cloud computing system 100 of FIG. 1, illustrating certain additional details, according to an example. FIG. 2 illustrates certain details not shown in FIG. 1 and also, for clarity, leaves out certain feature illustrated in FIG. 1. For example, details of hosts 104, infrastructure platform 154, and cloud computing environments 170 are not shown. Additionally, only a single VM (VMs 120 or VMs 172) is shown in both virtualized computing system 102 and cloud computing system 150 although those systems may support multiple VMs.

In FIG. 2, catalogs 166 are shown with VM templates 202 explicitly included. Further, each of transferring system and destination system includes one or more dictionaries 204. Dictionaries 204 assist in determining which data to transfer from a transferring system to a destination system and are discussed in greater detail below.

Although FIG. 2 illustrates a virtualized computing system 102 communicating with a cloud computing system 150 to migrate a VM, migration of a VM can be performed between other pairs of computing systems. For example, one virtualized computing system 102 may transfer a VM to another virtualized computing system 102 or one cloud computing system 150 may transfer a VM to another cloud computing system 150.

Virtualization manager 130 and cloud director 152 include migration modules 131 that cooperate to migrate VMs in a manner that reduces the amount of data that is to be migrated. Migration modules 131 may be embodied as virtual appliances. In the discussion herein, virtualized computing system 102 and components thereof as well as cloud computing system 150 and components thereof may be referred to as "migrating systems." Further, the particular computing system (virtualized computing system 102 and components thereof or cloud computing system 150 and components thereof) from which a VM is being transferred may be referred to herein as the "transferring system," while the particular computing system to which a VM is being transferred may be referred to herein as the "destination system." Note that any actions described as being performed by virtualized computing system 102 or cloud computing system 150 may be considered to be performed by one or more components thereof as appropriate.

Briefly, to migrate a VM, the transferring system first identifies a VM migrate. Identifying such a VM can be done in any manner, such as in response to an explicit administrator input or automatically/programmatically. After determining which VM to migrate, the migration module 131 of the transferring system compares at least a portion of a dictionary for the VM to be transferred with at least a portion of a dictionary of a VM at the destination system that is deemed to be "the closest" VM to the VM to be transferred. The transferring system then compresses the VM to be transferred based on the overlap in the two dictionaries, and transfers the compressed VM to the destination system. The destination system decompresses the compressed VM based on the dictionary for that VM. FIGS. 3A-3D and 4-5 illustrate additional details regarding techniques for migrating a VM from a transferring system to a destination system, according to an example.

Figure 3A:
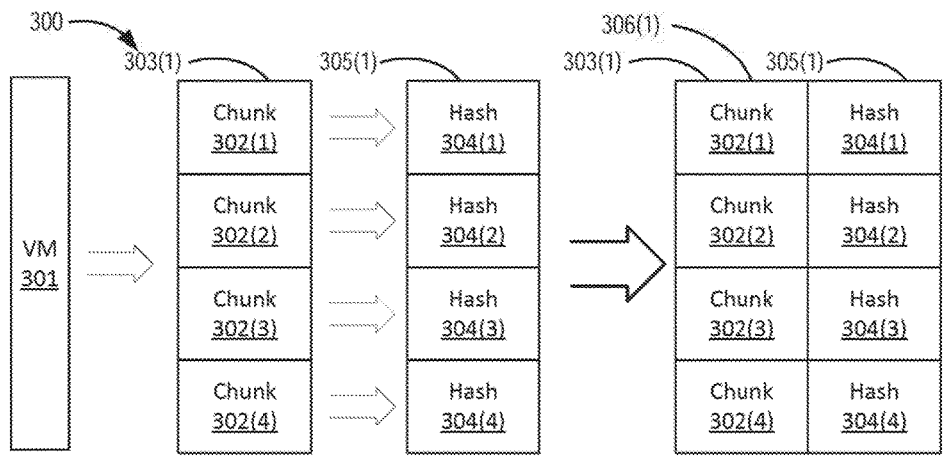
FIGS. 3A-3D illustrate various operations related to migrating a VM, according to examples.
Figure 3B:
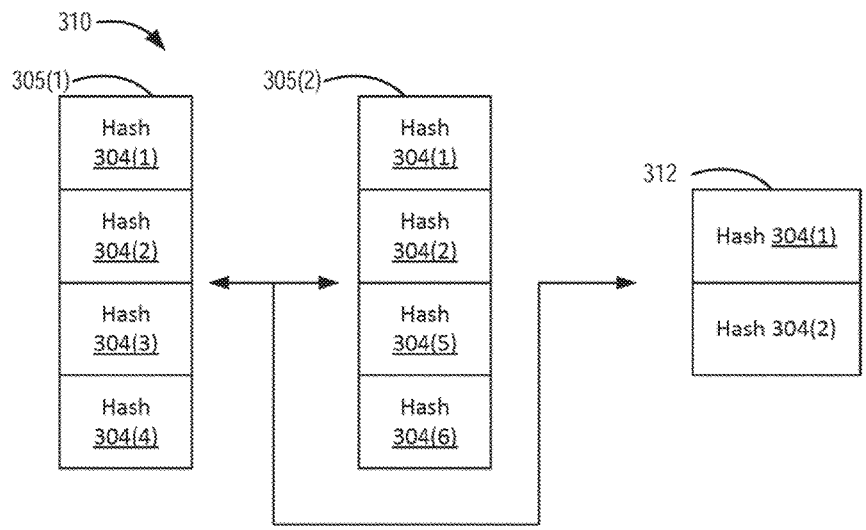
Figure 4:
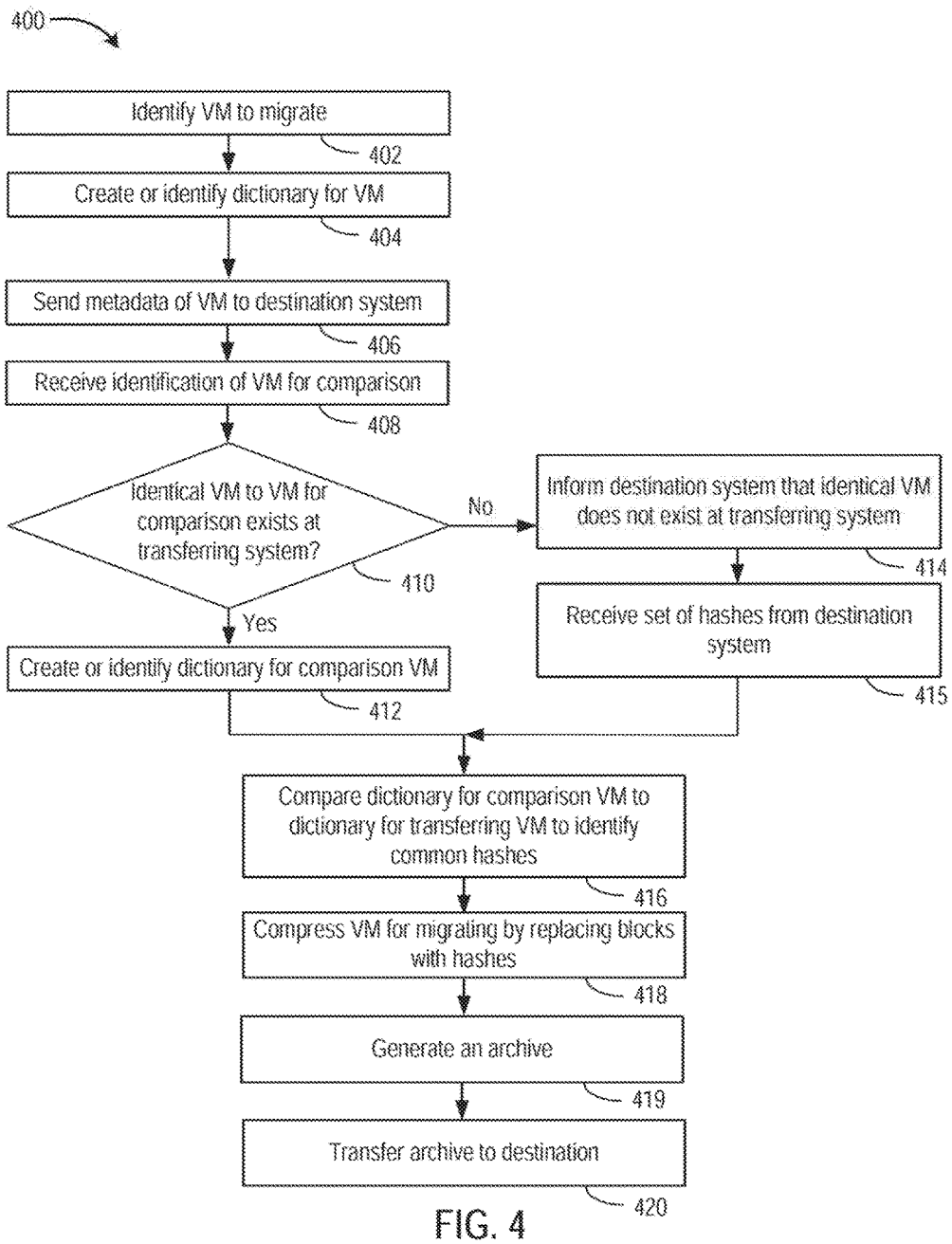
FIG. 4 is a flow diagram of a method for migrating a VM, described from the perspective of a transferring system, according to an example.
Figure 5:
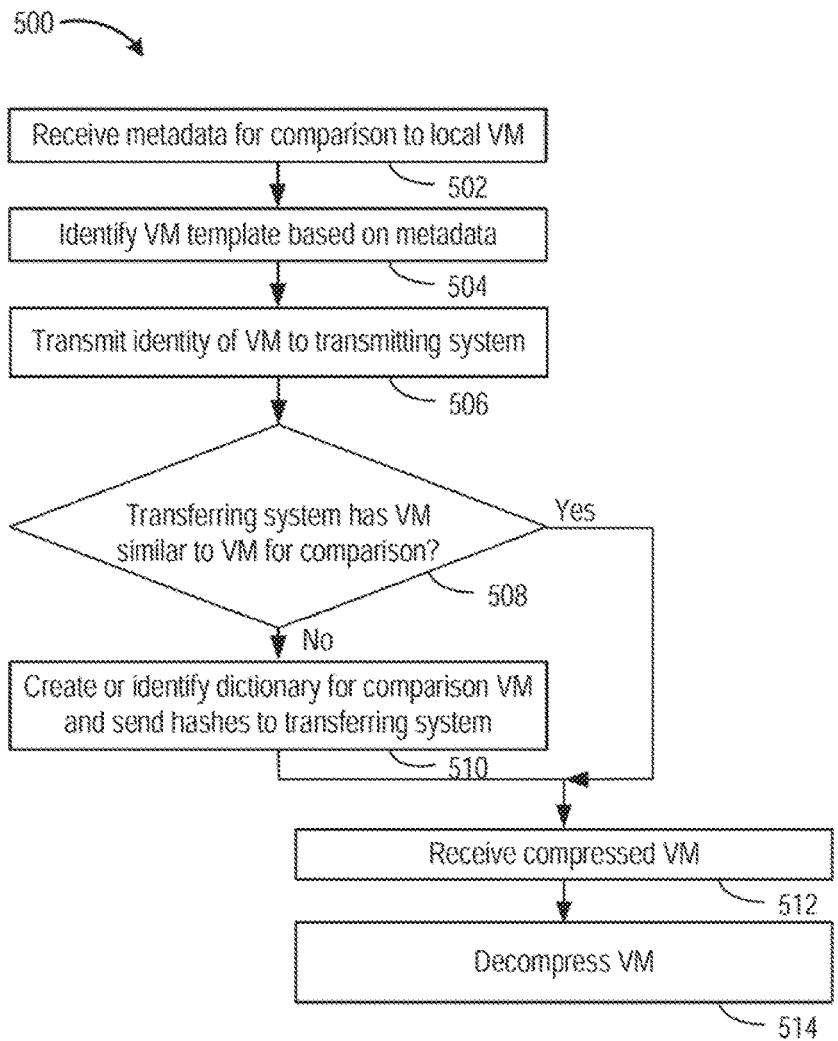
FIG. 5 is a flow diagram of a method for migrating a VM, described from the perspective of a destination system, according to an example.

FIGS. 3A-3D illustrate various operations related to migrating a VM, according to examples. FIG. 4 is a flow diagram of a method 400 for migrating a VM, described from the perspective of a transferring system, according to an example. FIG. 5 is a flow diagram of a method 500 for migrating a VM, described from the perspective of a destination system, according to an example. Although method 400 and method 500 are described with respect to the system of FIGS. 1-2, those of skill in the art will recognize that any system that performs the steps of method 400 and method 500, in various alternative technically feasible orders, falls within the scope of the present disclosure.

FIGS. 3A-3D, 4, and 5 are now discussed together. Note that FIG. 4 represents operations performed by a transferring system and FIG. 5 represents operations performed by a destination system. However, in the discussion below, the steps of method 400 and method 500 are described together, in order to give an overall picture of the cooperation between the transferring system and the destination system.

Method 400 begins at step 402, where the transferring system identifies a VM to migrate. The transferring system may, for example, identify such a VM in response to an administrator or user specifically requesting a particular VM to be migrated. The transferring system may also identify such a VM in response to automatic triggers that programmatically determine conditions upon which VMs are to be migrated, or may identify a VM to be migrated in any alternative technically feasible manner.

At step 404, the transferring system creates (or locates, if already created) a dictionary for the identified VM. Referring momentarily to FIG. 3A, an operation 300 for creating a dictionary is illustrated. A migration module 131 at the transferring system divides identified VM 301 (which can be, for example, any of VMs 120 or VMs 172) into chunks 302, which are subdivisions of the data that comprise identified VM 301. This data includes one or more virtual machine disk files ("VMDK files") and VM metadata. In some embodiments, all of the data in the one or more VMDK files for a particular VM is divided into multiple non-overlapping chunks, so that data for the VM is entirely represented by chunked data.

In some embodiments, determining how to chunk the VM is done with Rabin Fingerprinting, first described in a paper by Michael O. Rabin. Rabin Fingerprinting generates chunks from a data stream in a manner that is dictated by content, rather than by location. Generated chunks are substantially unaffected by insertions and deletions in the VM templates and VM templates that are remote from each other will generate similar chunking patterns. The ability to generate similar chunks in this manner allows for data that is present in both the VM to be transmitted and the VM template in a catalog at the destination to be chunked in the same manner, thereby producing identical chunks for identical data. Including identical data in identical chunks provides the transferring system the ability to identify, in a chunk-wise manner, which data does not need to be transmitted from the transferring system to the destination system.

The result of chunking identified VM 301 is chunked VM 303, which includes a series of chunks 302. To generate a dictionary for identified VM 301, the transferring system generates hashes 304 for each of the chunks 302 to generate a set of hashes 305 for identified VM 301. Each hash 304 in the set of hashes is associated with the chunk from which that hash is created. Each hash is a hash of the associated chunk. In some embodiments, the hashes are MD5 hashes. The end result of chunking identified VM 301 and generating the set of hashes is a dictionary 306(1) for identified VM 301, the dictionary including chunked VM 303 and set of hashes 305.

Referring back to FIG. 4, at step 406, the transferring system sends metadata for identified VM 301 to the destination system so that the destination system may find a "closest" VM to identified VM 301. Regarding this "closest" VM, first, note that both the transferring system and the destination system maintain a catalog 166 of VMs. Catalogs include VM templates 202 from which VMs may be spawned. The data in VM templates 202 may be used to identify blocks of a VM that do not need to be transferred. The goal of identifying the "closest" VM is to determine which VM template 202 is considered to contain a suitable amount of data that is identical to the VM that is to be transferred.

The transferring system and the destination system may (and typically do) have different VM templates 202 stored in respective catalogs 166. Thus, the migrating systems identify an appropriate VM template 202 in the catalog 166 at the destination system for comparison to the VM to be transferred. This "appropriate" VM template 202 is deemed to be the "closest" VM. One technique for identifying the "closest" VM template to the VM that is to be transferred is through the use of VM metadata. More specifically, VM templates 202 store VM metadata that describes the software that is installed in the VM template. Such software may include an operating system as well as applications and other data. The metadata that is transmitted to the destination system in step 406 is this metadata—i.e., a description of what software (operating system and applications), as well as, optionally, what other data, is stored on identified VM 301. This metadata is used by the destination system to identify a closest VM template.

At step 502 of method 500 (FIG. 5), the destination system receives the metadata from the transferring system. At step 504, the destination system identifies a VM template based on the metadata. This identified VM template is considered to be the "closest" VM template to the VM for which the metadata has been received from the transferring system.

To identify a "closest" VM template to the VM to be transferred, the destination system compares the metadata received from the transferring system to the metadata of each VM template 202 in the catalog 166 at the destination to obtain a match. In some embodiments, matches between the VM to be transferred and a VM template in the destination system are determined based on the degree to which the metadata matches. In some embodiments, the destination system generates a match score based on the number of installed software items that match. Thus, the greater the number of installed software that matches, the greater the score indicating a match between VM to be transferred and a VM template 202 in the destination system. In one example, a VM template that has the same operating system as a VM to be transferred and also has five of the same applications installed as the VM to be transferred has a score of six. Moreover, in some embodiments, software items may be weighted by size, such that larger items that match produce a greater score than smaller items. Although several example techniques for identifying the "closest" VM template to the VM to be transferred are described, those of skill in the art will recognize that other techniques may be utilized.

Once the identity of the "closest" VM has been determined, at step 506, the destination system transmits this identity to the transferring system and at step 408 (FIG. 4), the transferring system receives this identity from the destination system. At step 410, the transferring system determines whether there exists an identical VM to the VM for comparison (i.e., the "closest" VM to the VM that is to be transferred from the transferring system to the destination system). In some embodiments, this determination may be made by matching an md5 hash and metadata of the type described above for the two VMs. If such a VM exists at the transferring system, then method 400 proceeds to step 412 and if such a VM does not exist at the transferring system, then method 400 proceeds to step 414. At step 412, the transferring system creates a dictionary based on the "closest" VM (for which an identical copy exists at the transferring system). After step 412, method 400 proceeds to step 416.

At step 414, the transferring system informs the destination system that the transferring system does not have a VM that is identical to the "closest" VM. At step 508 (FIG. 5), destination system determines whether the transferring system has a VM that is identical to the "closest" VM. This determination may be made based on an indication received from the transferring system (e.g., step 414 of FIG. 4). More specifically, if the transferring system does not have such an identical VM, then the transferring system requests a set of hashes corresponding to that VM from the destination system (thus transmitting an indication that the transferring system does not have a VM that is identical to the "closest" VM).

If, at step 508, the transferring system does not have a VM that is identical to the "closest" VM, then method 500 proceeds to step 510, and if, at step 508, the transferring system does have such a VM, then method 500 proceeds to step 512. At step 510, the destination system creates (or locates, if already created) a dictionary based on the "closest" VM and transfers the set of hashes of that dictionary to the transferring system. Thus, at step 415, the transferring system receives a set of hashes corresponding to the closest VM from the destination VM. After step 508 or step 510, method 500 proceeds to step 512. Note that in either step 412 (FIG. 4) or step 510 (FIG. 5), generating the dictionary may be performed as described with respect to FIG. 3A and step 404 of FIG. 4.

At step 416, the transferring system has the set of hashes corresponding to the "closest" VM and compares that set of hashes to the set of hashes corresponding to the VM to be transferred to the destination system. The operation of comparing sets of hashes is described in more detail with respect to FIG. 3B. In FIG. 3B, a set of hashes 305(1) corresponding to the VM to be transferred is shown as including hash 304(1) corresponding to chunk 302(1), hash 304(2), corresponding to chunk 302(2), hash 304(3), corresponding to chunk 302(3), and hash 304(4), corresponding to chunk 302(4). Additionally, a set of hashes 305(2) corresponding to the "closest" VM is shown as including hash 304(1) corresponding to chunk 302(1), hash 304(2), corresponding to chunk 302(2), hash 304(5), corresponding to chunk 302(5), and hash 304(6), corresponding to chunk 302(6). The comparison operation of step 416 includes determining the intersection of the hashes 304 of set of hashes 305(1) for the VM to be transferred with the hashes 304 of the set of hashes 305(2) for the "closest" VM at the destination system. This intersection includes the hashes that exist in both sets of hashes 305. In the example shown in FIG. 3B, the intersection includes hash 304(1) and hash 304(2), because both of these hashes are included in both of the sets of hashes 305.

At step 418 the transferring system compresses the VM to be transferred based on the intersection of the sets of hashes 305 and also based on the dictionary for the VM to be transferred. More specifically, the transferring system replaces chunks 302 of the VM to be transferred that correspond to the intersecting hashes 304 with corresponding hashes of the intersecting hashes. The transferring system also replaces chunks 302 of the VM to be transferred that correspond to hashes only included in the dictionary for the VM to be transferred with hashes corresponding to those chunks. The result of step 418 is a compressed VM that only includes hashes. The hashes are either in the intersecting set of hashes—and are thus common to the VM to be transferred and the "closest" VM at the destination system—or are in the dictionary for the VM to be transferred and are only present in the VM that is to be transferred, and not in the "closest" VM at the destination system.

Figure 3C:
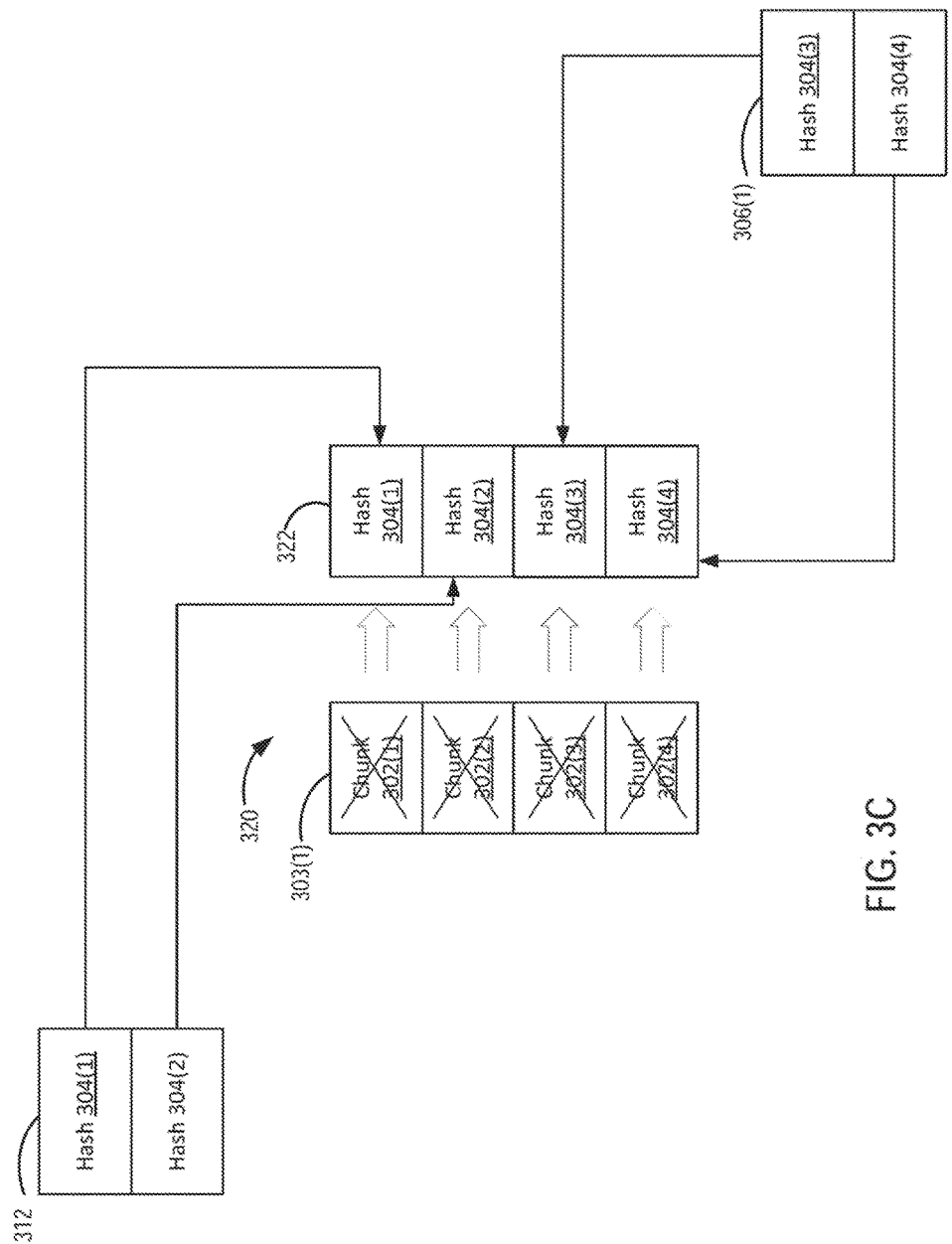

FIG. 3C illustrates the compression operation in more detail. In FIG. 3C, a chunked VM 303(1) is compressed to form a compressed VM 322. Transferring system determines that chunk 302(1) and chunk 302(2) both exist in the intersection 312 (FIG. 3B) and replaces those chunks 302 with corresponding hashes—hash 304(1) and hash 304(2). Thus, compressed VM 322 includes hashes 304 for chunks that exist at both the transferring system and the destination system. Transferring system determines that chunk 302(3) and chunk 302(4) exist only in the dictionary 306(1) for the VM to be transferred and includes hash 304(3) for chunk 302(3) and hash 304(4) for chunk 302(4). Thus compressed VM 322 also includes hashes that exist only at the transferring system but not at the destination system.

Returning to FIG. 4, at step 419, transferring system generates an archive that includes the compressed VM generated at step 418 as well as a differential dictionary. The differential dictionary includes all hashes 304 and chunks 302 that are included within the dictionary of the VM to be transferred that are not included within the dictionary of the "closest" VM at the destination system. Thus, the differential dictionary provides the destination system with chunks to replace hashes that are only present in the source system but not in the destination system. At step 420, transferring system transmits the archive generated at step 419 to the destination system.

Figure 3D:
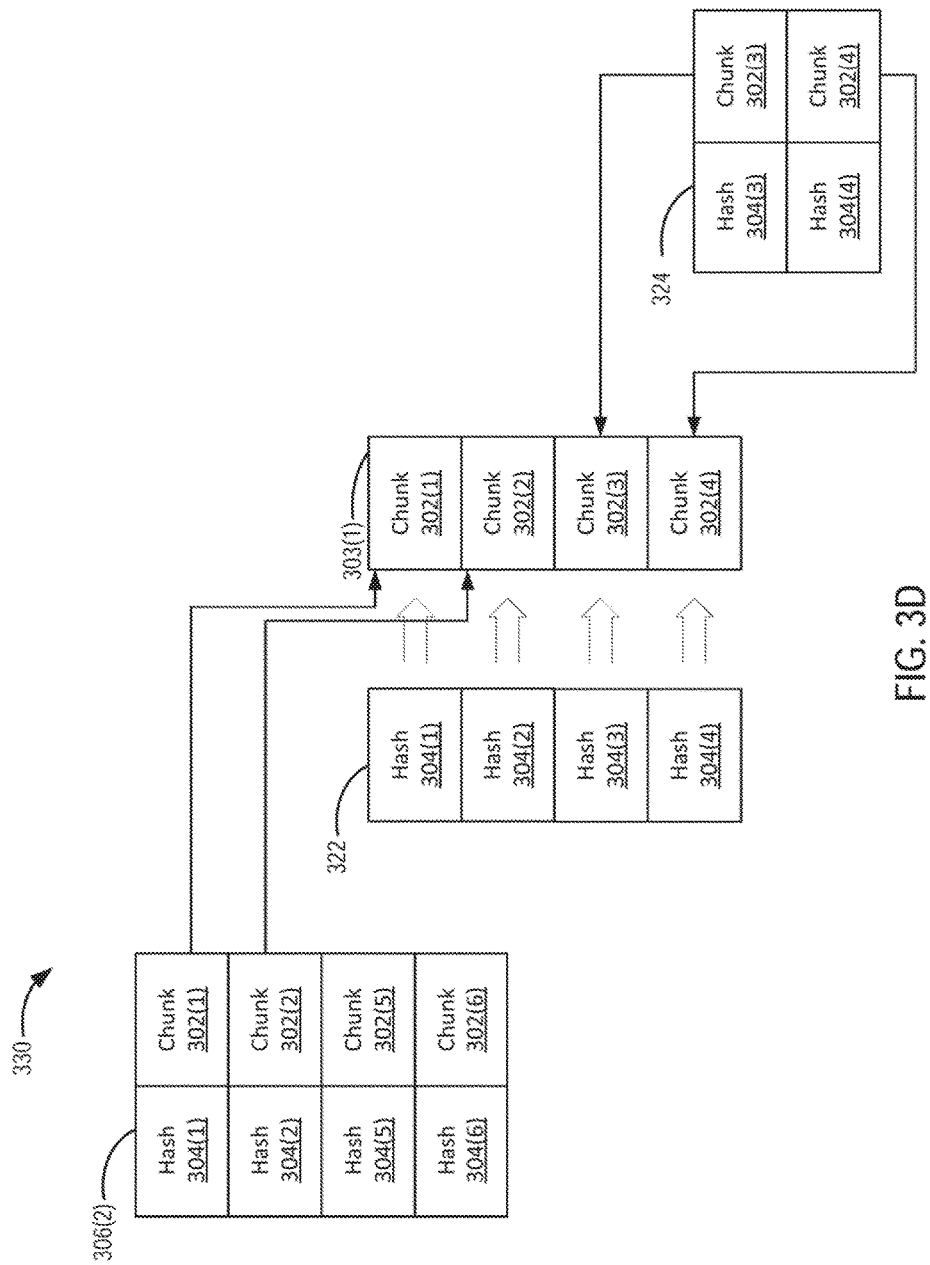

At step 512 (FIG. 5), the destination system receives the archive and at step 514, decompresses the compressed VM based on the differential dictionary within the archive and the dictionary of the "closest" VM. FIG. 3D presents the operation of decompressing a VM in greater detail. To decompress compressed VM 322, destination system replaces hashes 304 within compressed VM 322 with chunks from either the dictionary of the closest VM or the differential dictionary received in the archive. Because hash 304(1) and hash 304(2) are found in the dictionary for the closest VM (i.e., dictionary 306(2)), destination system replaces those hashes with chunk 302(1) and chunk 302(2) respectively. Because hash 304(3) and hash 304(4) are found in the differential dictionary 324, destination system replaces hash 304(3) and hash 304(4) with chunk 302(3) and chunk 302(4).

Note that in the above description of methods 400 and 500, actions described as being performed by the transferring system or the destination system may be considered to be performed by the migration modules 131 of either the transferring system or the destination system, respectively.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

Although one or more embodiments have been described herein in some detail for clarity of understanding, it should be recognized that certain changes and modifications may be made without departing from the spirit of the disclosure. The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, yielding, identifying, determining, or comparing. Any operations described herein that form part of one or more embodiments of the disclosure may be useful machine operations. In addition, one or more embodiments of the disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present disclosure may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Many variations, modifications, additions, and improvements are possible. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method for migrating a first virtual machine from a source computing system to a destination computing system, the method comprising:
    identifying a first dictionary for the first virtual machine;
    comparing the first dictionary with a second dictionary that corresponds to a second virtual machine identified from a catalog of virtual machine templates at the destination computing system, to output a set of common hashes;
    based on the set of common hashes, compressing the first virtual machine to generate a compressed virtual machine comprised of hashes in the set of common hashes without corresponding data chunks and at least one hash without corresponding data chunks, or comprised of hashes of the first dictionary without corresponding data chunks, wherein the at least one hash is found in the first dictionary but is not found in the second dictionary; and
    transmitting the compressed virtual machine and a differential dictionary that comprises the at least one hash and at least one corresponding data chunk to the destination computing system.

2. The method of claim 1, wherein the first dictionary comprises:
    a set of chunks of data for the first virtual machine; and
    a set of hashes, each hash being a hash of a different chunk of the set of chunks of data.

3. The method of claim 2, further comprising generating the first dictionary by:
    chunking a virtual machine disk file to generate the set of chunks; and
    hashing the chunks of the set of chunks to generate the set of hashes.

4. The method of claim 1, wherein compressing the first virtual machine comprises:
    replacing chunks of the first virtual machine with hashes of the set of common hashes.

5. The method of claim 1, wherein comparing the first dictionary with the second dictionary comprises:
    identifying, as the set of common hashes, hashes within the first dictionary that are also present in the second dictionary.

6. The method of claim 1, further comprising:
    obtaining first metadata that indicates software installed on the first virtual machine;
    comparing the first metadata to metadata associated with virtual machines at the destination computing system; and
    identifying the second virtual machine based on the comparing.

7. The method of claim 1, wherein:
    an identical virtual machine to the second virtual machine exists at the source computing system, and
    the source computing system does not receive the second dictionary from the destination system.

8. The method of claim 1, wherein:
    an identical virtual machine to the second virtual machine does not exist at the source computing system, and
    the source computing system receives a set of hashes associated with the second dictionary from the destination system.

9. The method of claim 1, further comprising:
    decompressing the compressed virtual machine by replacing hashes in the compressed virtual machine with chunks from the second dictionary and the differential dictionary.

10. A system for migrating a first virtual machine from a source computing system to a destination computing system, the system comprising:
    the source computing system, comprising:
        a hypervisor configured to execute the first virtual machine; and
        a migration module configured to:
        identify a first dictionary for the first virtual machine,
        compare the first dictionary with a second dictionary that corresponds to a second virtual machine identified from a catalog of virtual machine templates at the destination computing system, to output a set of common hashes,
        based on the set of common hashes, compress the first virtual machine to generate a compressed virtual machine comprised of hashes in the set of common hashes without corresponding data chunks and at least one hash without corresponding data chunks, or comprised of hashes of the first dictionary without corresponding data chunks, wherein the at least one hash is found in the first dictionary but is not found in the second dictionary, and
        transmit the compressed virtual machine and a differential dictionary that comprises the at least one hash and at least one corresponding data chunk to the destination computing system.

11. The system of claim 10, wherein the first dictionary comprises:
    a set of chunks of data for the first virtual machine; and
    a set of hashes, each hash being a hash of a different chunk of the set of chunks of data.

12. The system of claim 11, wherein the migration module is configured to generate the first dictionary by:

chunking a virtual machine disk file to generate the set of chunks; and hashing the chunks of the set of chunks to generate the set of hashes.

13. The system of claim 10, wherein the migration module is configured to compress the first virtual machine by:

replacing chunks of the first virtual machine with hashes of the set of common hashes.

14. The system of claim 10, wherein the migration module is configured to compare the first dictionary with the second dictionary by:

identifying, as the set of common hashes, hashes within the first dictionary that are also present in the second dictionary.

15. The system of claim 10, wherein the destination system is configured to:

obtain first metadata that indicates software installed on the first virtual machine;

compare the first metadata to metadata associated with virtual machines at the destination computing system; and identify the second virtual machine based on the comparing.

16. The system of claim 10, wherein:

an identical virtual machine to the second virtual machine exists at the source computing system, and the source computing system does not receive the second dictionary from the destination system.

17. The system of claim 10, wherein:

an identical virtual machine to the second virtual machine does not exist at the source computing system, and the source computing system receives a set of hashes associated with the second dictionary from the destination system.

18. The system of claim 10, wherein the destination system is configured to decompress the compressed virtual machine by replacing hashes in the compressed virtual machine with chunks from the second dictionary and the differential dictionary.

19. A non-transitory computer-readable medium storing instructions that, when executed by a processor, cause the processor to perform a method for migrating a first virtual machine from a source computing system to a destination computing system, the method comprising:

identifying a first dictionary for the first virtual machine;

comparing the first dictionary with a second dictionary that corresponds to a second virtual machine identified from a catalog of virtual machine templates at the destination computing system, to output a set of common hashes;

based on the set of common hashes, compressing the first virtual machine to generate a compressed virtual machine comprised of hashes in the set of common hashes without corresponding data chunks and at least one hash without corresponding data chunks, or comprised of hashes of the first dictionary without corresponding data chunks, wherein the at least one hash is found in the first dictionary but is not found in the second dictionary; and transmitting the compressed virtual machine and a differential dictionary that comprises the at least one hash and at least one corresponding data chunk to the destination computing system.

20. The non-transitory computer-readable medium of claim 19, wherein the first dictionary comprises:

a set of chunks of data for the first virtual machine; and a set of hashes, each hash being a hash of a different chunk of the set of chunks of data.

* * * * *